UNITED STATES PATENT OFFICE.

JOHN W. SUTTON, OF AKRON, OHIO.

IMPROVEMENT IN THE MANUFACTURE OF INDIA-RUBBER GOODS.

Specification forming part of Letters Patent No. 132,185, dated October 15, 1872.

*To all whom it may concern:*

Be it known that I, JOHN W. SUTTON, of Akron, in the county of Summit and State of Ohio, have invented an Improvement in the Manufacture of India-Rubber Goods, of which the following is a specification:

It is a well-known fact that the cloth which gives strength to rubber hose, belting, packing, and other rubber goods, often becomes in a short time rotten and worthless, causing the article to burst, break, or tear. From a series of experiments I have discovered that this effect is caused by the cloth becoming damp or wet, and in drying without air decays like the dry-rot in timber. The object of my invention is to prevent this decay, and I accomplish it in the following manner:

Immerse the cloth to be used in the manufacture of rubber goods from one to three days in a saturated solution of phosphate of soda. Dry the cloth, and again immerse it in a solution of muriate of baryta. Again dry the cloth and use it in the manufacture of rubber goods in the usual way.

I do not claim as new the use of phosphate of soda and muriate of baryta for the purpose of protecting wood and fibrous substances from decay; nor do I claim as my invention the use of preservative substances in the manufacture of India-rubber goods to prevent the decay either of the rubber or the cloth incident to that class of goods, as patents have already been granted to John Murphy, of New York, on February 15, 1870, and to Thomas J. Mayall, of Roxbury, Massachusetts, of date November 29, 1859, to accomplish this object; but

What I claim, and desire to protect by Letters Patent, is—

The application of cloth prepared in the aforesaid manner to the manufacture of rubber goods, as and for the purpose set forth.

JOHN W. SUTTON.

Witnesses:
   B. F. GOODRICH,
   HARVEY W. LEW.